R. K. ASELSTINE & G. W. LANGDON.
GARMENT CREASER.
APPLICATION FILED JAN. 17, 1910.
966,640.
Patented Aug. 9, 1910.
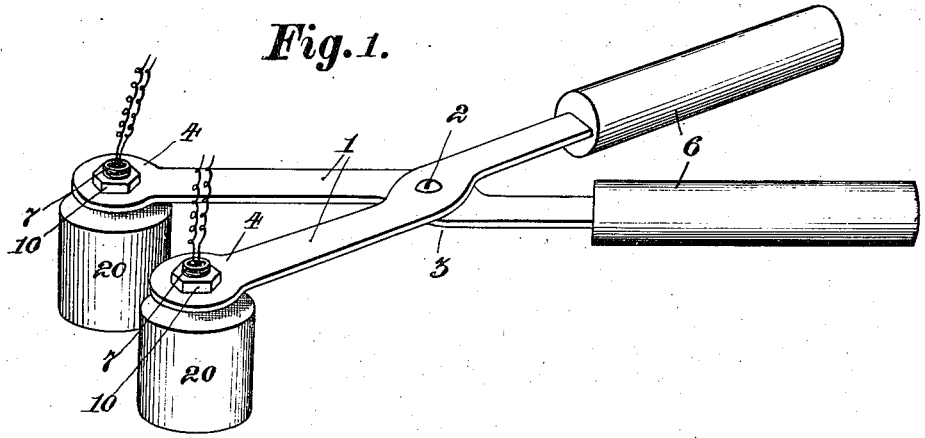
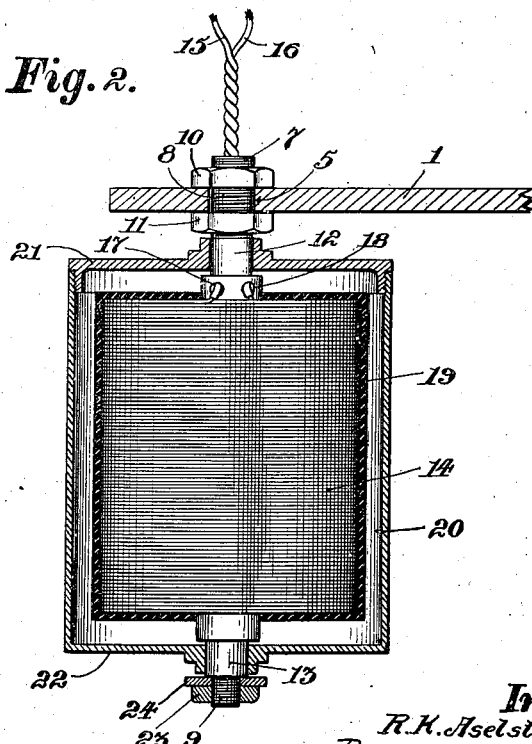
Witnesses.
H. Davis
P. Shee.
Inventors.
R. K. Aselstine & G. W. Langdon.
By
Atty

UNITED STATES PATENT OFFICE.

ROY K. ASELSTINE AND GEORGE W. LANGDON, OF OTTAWA, ONTARIO, CANADA.

GARMENT-CREASER.

966,640.  Specification of Letters Patent.  Patented Aug. 9, 1910.

Application filed January 17, 1910. Serial No. 538,537.

*To all whom it may concern:*

Be it known that we, ROY KNIGHT ASELSTINE and GEORGE WILLIAM LANGDON, British subjects, both residents of 506 Besserer street, in the city of Ottawa, in the Province of Ontario, in the Dominion of Canada, have invented certain new and useful Improvements in Garment-Creasers; and we do hereby declare that the following is a full, clear, and exact description of the same.

The invention relates to improvements in garment creasers, as described in the present specification and illustrated in the accompanying drawings that form part of the same.

The invention consists essentially in the novel construction and arrangement of parts whereby trousers and other garments may be creased by an electric ironing appliance, without removal from the body of the wearer.

The objects of the invention are to provide a simple appliance which may be used by the individual at his home or by trades-men for pressing clothes, that is ironing a proper crease in them in a very few minutes, and generally to devise an efficient and cheap electric creaser easily within the reach of all consumers.

In the drawings, Figure 1 is a perspective view of the creaser complete. Fig. 2 is an enlarged sectional view of a rotary iron and a portion of an arm.

Like numerals of reference indicate corresponding parts in each figure.

Referring to the drawings, 1 and 1 are the arms pivotally secured together intermediate of their length by the pivot pin 2 and preferably made of flat bars slightly off-set at 3 adjacent to the pivot point and having the enlarged ends 4 and the holes 5 through said enlarged ends.

6 are handles secured on the other ends of the arms 1 preferably of wood or other non-conducting material though the arms themselves may form the handles if desired.

7 are tubes having threaded ends 8 and 9 and extending through the holes 5 being rigidly held to the enlarged end of the arms 1 by the nuts 10 and 11, said tubes forming the bearings 12 and 13.

14 are resistance coils rigidly secured around the tubes 7 between the bearings 12 and 13, said coils 14 being electrically connected with a suitable electric current supply by the wires 15 and 16 leading through the holes 17 and 18 and through the tubes 7.

19 is insulation around the coils 14.

20 are drums or rotary irons preferably having the removable heads 21 and the fixed heads 22, said heads 21 and 22 being centrally journaled on the bearings 12 and 13.

23 are nuts holding the washers 24 securely on the reduced outer ends of the tubes 7.

In the operation of this appliance, the wires 15 and 16 are suitably connected to an electric current supply and the handles 6 taken in either one or two hands and the arms 1 operated in a similar manner to the opening and closing of shears, the leg of the trousers is then gripped between the drums 20, the trouser leg previously having been slightly dampened at the crease, the drums are then brought together and rolled up and down the said trouser leg until the crease is perfectly formed.

The drums or rotary irons are, of course, heated by the resistance coils 14 and in this connection it may be pointed out that these rotary irons may not be constructed precisely as set forth in detail herein, and it is possible to make modifications within the scope of the claims without departing from the spirit of the invention.

What we claim as our invention is:

1. In garment creasers, a pair of arms pivotally joined intermediate of their length, tubes extending from said arms at their outer ends and rigidly held thereto and forming bearings, resistance coils rigidly secured to said tubes between said bearings, wires extending from said resistance coils through said tubes and adapted to connect said coils to an electric current supply, and drums journaled on said tubes and forming rotary ironing members and inclosing said resistance coils and heated thereby.

2. In garment creasers, a pair of arms offset centrally and pivotally joined at said offset, said arms having suitable handles and enlarged outer ends and holes in said enlarged outer ends, tubes having threaded ends extending through said holes, nuts rigidly securing said tubes to said arms, resistance coils rigidly supported on said tubes, wires extending from said resistance coils into said tubes and therethrough and adapted to connect said coils to an electric current supply, drums having removable heads and journaled on said tubes and forming rotary ironing members, and nuts forming keepers on the outer ends of said tubes.

Signed at the city of Ottawa, Province of Ontario, Canada, this 10th day of January, 1910.

ROY K. ASELSTINE.
GEORGE W. LANGDON.

Witnesses:
RENÉ A. LIGEON,
BERNHARD A. RENNBACK.